United States Patent

Kawai et al.

[11] Patent Number: 5,833,303
[45] Date of Patent: Nov. 10, 1998

[54] PILLAR CONSTRUCTION FOR VEHICLE BODIES

[75] Inventors: Akira Kawai, Minami-ashigara; Kenichi Saito, Fujisawa; Tetsuo Maki, Yokosuka, all of Japan

[73] Assignee: Nissan Motor Co., Ltd., Kanagawa, Japan

[21] Appl. No.: 770,253

[22] Filed: Dec. 20, 1996

[30] Foreign Application Priority Data

Dec. 26, 1995 [JP] Japan ................................. 7-339548
Dec. 11, 1996 [JP] Japan ................................. 8-331287

[51] Int. Cl.$^6$ ................................. B62D 25/04
[52] U.S. Cl. ..................... 296/189; 296/39.1; 280/751
[58] Field of Search ................... 296/39.1, 188, 296/189, 203, 205, 203.01, 203.03; 280/748, 751

[56] References Cited

U.S. PATENT DOCUMENTS 3,779,595 12/1973 Suzuki et al. ..................... 296/189 X
5,609,385 3/1997 Daniel et al. ..................... 296/189 X

FOREIGN PATENT DOCUMENTS 4-125953 11/1992 Japan .
5-19010 3/1993 Japan .

*Primary Examiner*—Andrew C. Pike
*Attorney, Agent, or Firm*—McDermott, Will & Emery

[57] ABSTRACT

A pillar construction for a vehicle body includes a steel pad formed from a resilient sheet steel and disposed between a pillar inner panel of a pillar main body and a pillar trim. In a secondary collision in which the pillar trim is subjected to a force directed outward of a vehicle body and deformed thereby, the steel pad produces a reaction force against deformation of the pillar trim at the initial stage of the secondary collision and substantially no reaction force at the final stage of the secondary collision.

15 Claims, 2 Drawing Sheets

FRONT ←→ REAR

PILLAR CONSTRUCTION FOR VEHICLE BODIES

BACKGROUND OF THE INVENTION

1. Field of the Invention

The present invention relates to a pillar construction for vehicle bodies, particularly for automotive vehicle bodies.

2. Description of the Art

An example of a prior art vehicle body pillar construction is disclosed in Japanese Utility Model provisional publication No. 4-125953. The pillar construction includes a hollow pillar trim or garnish which has at the rear wall thereof a front wall support having a semicircular cross section and protruding toward the front wall.

Another example is disclosed in Japanese Utility Model provisional publication No. 5-19010. The pillar construction includes a pillar trim which is supported on a pillar inner panel of a pillar main body in the form of a pillar or column. A through hole is formed through an inboard surface of the pillar main body at a location corresponding to a predetermined part of a passenger's body. A retractable buffer block is installed in the through hole so as to project outward therefrom. The buffer block is guided by the through hole so as to retract inward of the through hole when subjected to a striking force or impact directed widthwise of the vehicle.

In a collision of an automotive vehicle, i.e., a so-called secondary collision accompanied by a primary collision, in which a passenger strikes his body against a pillar trim, it is effective or desirable to absorb the impact or striking energy in such a manner that the deceleration G of the passenger varies as represented by the dotted line curve in the graph of FIG. 3 in which the axis of ordinate indicates the deceleration G and the axis of abscissa indicates the time S elapsing from the beginning of the secondary collision.

However, in case of the first-mentioned prior art pillar construction, the pillar trim is formed thick so as to be deformable gradually whilst absorbing the impact or striking energy, thus causing a problem that the space of the passenger's compartment becomes smaller by the amount corresponding to the large thickness of the pillar trim. Further, the impact absorbing characteristics exhibited by the prior art pillar construction is not approximate to such an ideal one as represented by the dotted line curve in FIG. 3 but such one in which the deceleration G of the passenger becomes maximum at the final stage of a secondary collision.

Further, in another prior art pillar construction, it is difficult to adjust the buffer block in such a manner that it can retract inward of the through hole when subjected to an impact directed widthwise of the vehicle. As a result, development of such a vehicle body pillar construction requires a large effort and expense, thus causing a high manufacturing cost.

SUMMARY OF THE INVENTION

According to an aspect of the present invention, there is provided a novel and improved pillar construction for a vehicle body which comprises a pillar main body having a pillar inner panel, a pillar trim supported on the pillar main body in such a manner as to cover the pillar inner panel, and a metal pad supported on the pillar inner panel and restrictedly movable through engagement with the pillar inner panel to produce a reaction force at an initial stage of reaction thereof in response to a force applied thereto from the inside of the vehicle body whereas being freely movable to produce substantially no reaction force after the initial stage. Accordingly, with the above pillar construction, when the pillar trim is subjected to a load in a collision of an automotive vehicle, i.e., a so-called secondary collision accompanied by a primary collision, in which a passenger strikes his body against the pillar trim, the metal pad comes in conflict with the pillar inner panel to produce a reaction force and prevent deformation of the pillar trim at the initial stage of reaction of the metal pad, whereby a high or abrupt deceleration of the passenger can be attained assuredly at the initial stage of the secondary collision. Thereafter, at the final stage of the secondary collision, the reaction force of the metal pad is limited to a small value, i.e., substantially no reaction force is produced by the metal pad. Accordingly, the pillar construction of this invention can absorb the impact or striking energy effectively and desirably and can make the pillar trim thinner so that the space of the passenger compartment can be larger.

According to another aspect of the present invention, the metal pad has a central portion having a surface in contact with an inboard surface of said pillar inner panel, and has at least one side portion on the side of the central portion. The side portion has a protruded section located adjacent the pillar trim and a free end section located adjacent the inboard surface of the pillar inner panel. Accordingly, when the pillar trim is subjected to a load in a collision of an automotive vehicle, i.e., a so-called secondary collision accompanied by a primary collision, in which a passenger strikes his body against the pillar trim, the pillar trim starts deforming. Soon after, the pillar trim contacts at the rear or outboard surface thereof with the protruded section of the metal pad and strikes the free end section against the pillar inner panel, whereby further deformation of the pillar trim and the metal pad is prevented or restricted assuredly. Thereafter, at the final stage of the secondary collision, the free end section of the side portion is caused to slide on the surface of the pillar inner panel by the force applied to the pillar trim, thus making it possible to restrict the reaction force to a quite small value.

According to a further aspect of the present invention, the free end section of the side portion of the metal pad is flanged so as to be parallel to the inboard surface of the pillar inner panel. By this, when the pillar trim is subjected to a load in a secondary collision, the pillar trim starts deforming. Soon after the pillar trim starts deforming, the protruded section of the metal pad comes into contact or conflict with the outboard or rear surface of the pillar trim, whereby the flanged free end section comes into conflict with the inboard or front surface of the pillar inner panel. Further, at the final stage of the secondary collision, the flanged free end section is caused to slide on the inboard surface of the pillar trim by the load applied to the pillar trim, assuredly.

According to a further aspect of the present invention, the pillar trim and the pillar inner panel define therebetween a space enabling the free end section of the metal pad to be movable freely therewithin. By this, the metal pad is assuredly movable or deformable unrestrictedly at the final stage of the secondary collision since the free end section thereof is freely movable within that space.

According to a further aspect of the present invention, the pillar trim has an integral support projection projecting from an outboard surface thereof toward the pillar inner panel. The metal pad is held between the support projection of the pillar trim and the inboard surface of the pillar inner panel.

According to a further aspect of the present invention, the pillar construction further comprises a bracket attaching the pillar trim to the pillar inner panel. The pillar trim has at an outboard surface thereof two corner portions opposing to each other and two integral ribs in the form of thin plate. The bracket has opposite end portions at which it is secured to the ribs. The metal pad is held between the bracket and the inboard surface of the pillar inner panel.

The above pillar construction is effective for solving the above noted problems inherent in the prior art construction.

It is accordingly an object of the present invention to provide a novel and improved pillar construction for a vehicle body which can absorb the impact or striking energy in a collision of a vehicle in a desired manner, whilst enabling the pillar trim thinner for thereby increasing the space of the passenger compartment of the vehicle.

It is a further object of the present invention to provide a novel and improved pillar construction of the above described character which can absorb the impact or striking energy in a secondary collision in such a manner that the deceleration G of a passenger who strikes his body against the pillar trim becomes maximum at the initial stage of the secondary collision.

It is a further object of the present invention to provide a novel and improved pillar construction of the above described character which can attain an impact or striking energy absorbing means with little development effort and low cost.

DETAILED DESCRIPTION OF THE PREFERRED EMBODIMENTS

Figure 1:
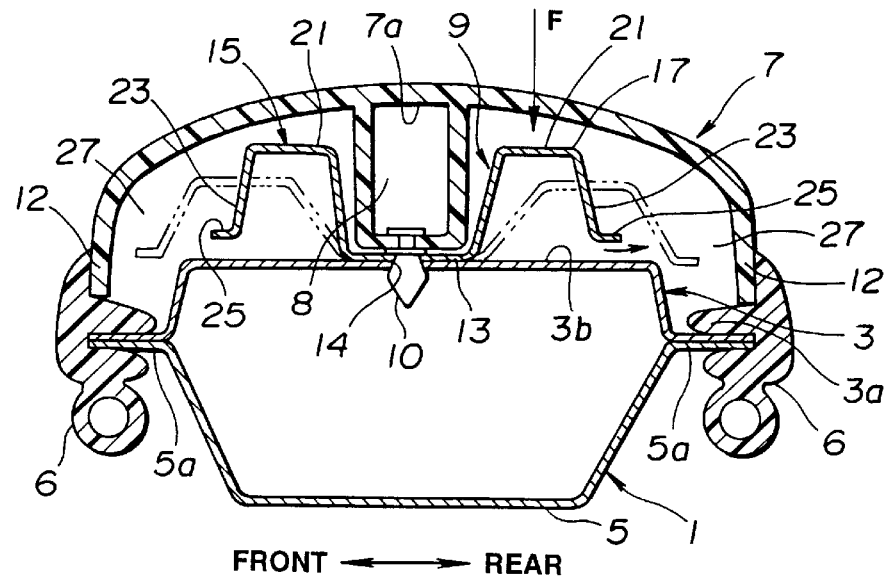
FIG. 1 is a cross sectional view of a pillar construction for a vehicle body according to the present invention, which is taken along the line I—I in FIG. 2.
Figure 2:
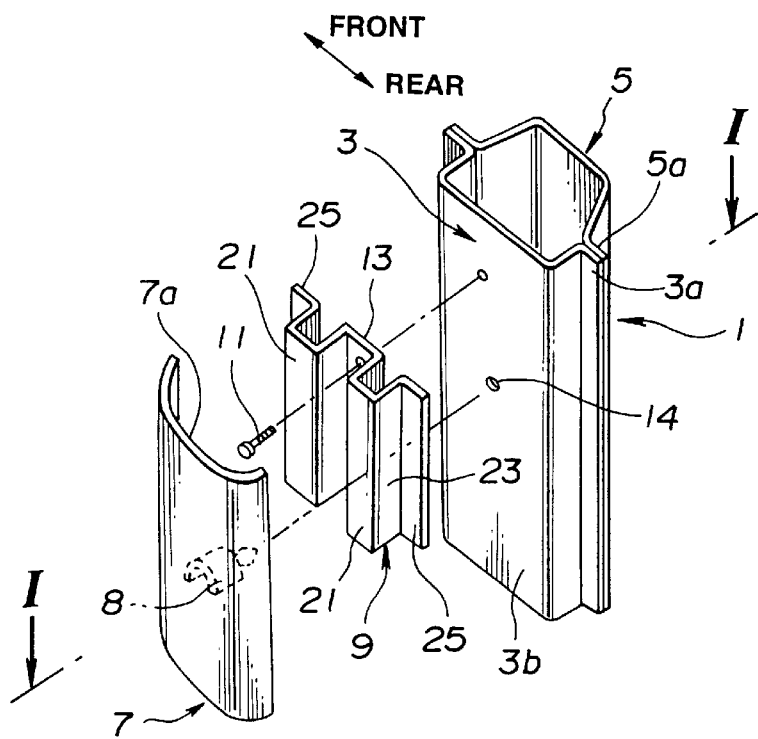
FIG. 2 is an exploded view of the pillar construction of FIG. 1.
Figure 3:
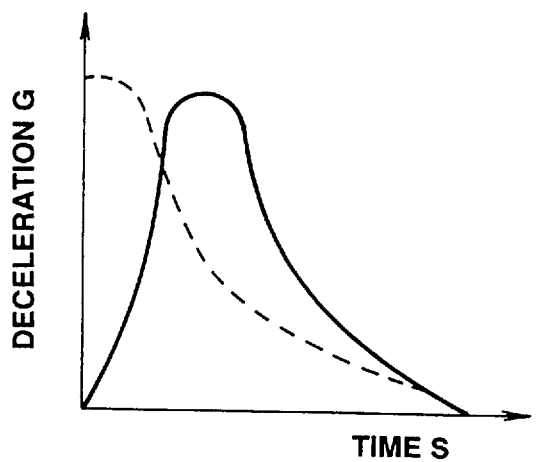
FIG. 3 is a graph of a relation between the deceleration G of a passenger who strikes his body against a pillar construction and the time S elapsing from the beginning of a secondary collision, in which the dotted line curve represents an ideal energy absorbing characteristic and the solid line curve represents the energy absorbing characteristic of the pillar construction of the present invention.

Referring to FIGS. 1 to 3, a pillar construction for a vehicle body according to the present invention includes a pillar main body 1 which is pillar-shaped or columnar and adapted to serve actually as a center pillar of a vehicle body. The pillar main body 1 consists of a pillar inner panel 3 and a pillar outer panel 5 which are joined together at respective front and rear flanges 3a and 5a thereof.

The pillar construction further includes a pair of weatherstrips 6 attached to the front and rear flanges 3a and 5a to cover a front end of the pillar trim 7 which will be described hereinafter.

The pillar trim 7 has a nearly U-shaped or C-shaped cross section which is curved smoothly and is disposed so as to cover an inboard or inner surface 3b of the pillar inner panel 3. The pillar trim 7 is elongated vertically and made of a synthetic resinous material.

The pillar trim 7 has on the outboard surface 7a thereof, i.e., on the outer surface 7a facing the inboard surface 3b of the pillar inner panel 3, an integral boss 8 serving as a support projection. The boss 8 has installed thereon a snap fastener 10 which is engaged in a through hole 14 of the pillar inner panel 3, whereby the pillar trim 7 is supported on the inboard surface 3b of the pillar inner panel 3.

The pillar construction further includes a steel pad 9 which is installed on the inboard surface 3b of the pillar inner panel 3 by means of a tapping screw 11 whilst being held between the boss 8 and the inboard surface 3b of the pillar inner panel 3.

The steel pad 9 has a central portion 13 located centrally with respect to a front-to-rear direction thereof. The central portion 13 has an attaching surface in contact with the inboard surface 3b of the pillar inner panel 3. The steel pad 9 further has front and rear side portions 15 and 17 located on the front and rear sides of the central portion 13 with respect to the front-to-rear direction of the vehicle body. The front and rear side portions 15 and 17 have protruded sections 21 which are symmetrical with respect to the central portion 13 and protrude so as to be positioned adjacent the outboard or rear surface 7a of the pillar trim 7. The front and rear side portions 15 and 17 further have free end sections 23 which are located adjacent the inboard or front surface 3b of the pillar inner panel 3. The free end sections 23 are flanged or have flanges 25 which are parallel to the inboard surface 3b of the pillar inner panel 3.

The pillar trim 7 has, between the outboard surface 7a thereof and the inboard surface 3b of the pillar inner panel 3, a space 27 which enables the free end sections 23 of the side portions 15 and 17 of the steel pad 9 to be movable freely.

In operation, in a collision of a vehicle, i.e., in a so-called secondary collision preceded by a primary collision in which a passenger of the vehicle strikes his body against the pillar trim 7, the pillar trim 7 is subjected to a load F and starts deforming. Soon after the pillar trim 7 starts deforming, its outboard surface 7a comes into conflict with the protruded sections 21 of the steel pad 9, thus causing the flanged free end sections 23 of the steel pad 9 to conflict with the inboard surface 3b of the pillar inner panel 3. By this, further deformation of the pillar trim 7 and the steel pad 9 is prevented or at least restricted assuredly, so that the pillar trim 7 and the steel pad 9 cooperate with the inboard surface 3b of the pillar inner panel 3 to produce a reaction force at the initial stage of the secondary collision, i.e., the initial stage of movement or deformation of the steel pad 9.

Then, at or near the end of the secondary collision, i.e., at the final stage of the secondary collision, the flanged free end sections 23 of the steel pad 9 are caused to slide on the inboard surface 3b of the pillar inner panel 3 by the load F applied to the pillar trim 7, so that the protruded sections 21 of the steel pad 9 of themselves are deformed as shown by the two-dot chain lines in FIG. 1. By this, the protruded sections 21 of the steel pad 9 are disabled to produce any substantial resistance to movement of the pillar trim 7, so that the steel pad 9 produces substantially no reaction force at the end of the secondary collision, i.e., at the end of deformation or movement of the steel pad 9. In this connection, the term "substantially no reaction force" is intended to indicate a reaction force which is quite small as compared with the reaction force produced by the steel pad 9 at the initial stage of the secondary collision.

The space 27 makes it assured for the flanged free end sections 23 of the steel pad 9 to slide on the inboard surface 3b of the pillar inner panel 3 of the pillar main body 1.

With the pillar construction of this invention, the deceleration G of the passenger who strikes his body against the pillar construction varies with the lapse of time S as represented by the solid line curve in FIG. 3. That is, the deceleration G of the passenger at the initial stage of a secondary collision can be high or abrupt assuredly, whereas the deceleration G at the final stage can be low or gradual, i.e., restricted to a small value, thus making it possible to decrease the deceleration whilst absorbing the impact or striking energy in a desired manner. Accordingly, the impact energy absorbing characteristic of the pillar construction of this invention, as represented by the solid line curve in FIG. 3, can be approximate to the ideal impact energy absorbing characteristic as represented by the dotted line curve in the same figure. Further, with the pillar construction of this invention, the pillar trim can be thinner, thus making it possible to increase the space of the passenger compartment. Further, in this embodiment, the steel pad 9 can be simple in shape and be attached to the pillar inner panel 3 by means of a clip 10 and a tapping screw 11 only, thus making it possible to obtain installation of the steel pad 9 serving as an impact energy absorbing means with a little development effort and low cost.

Figure 4:
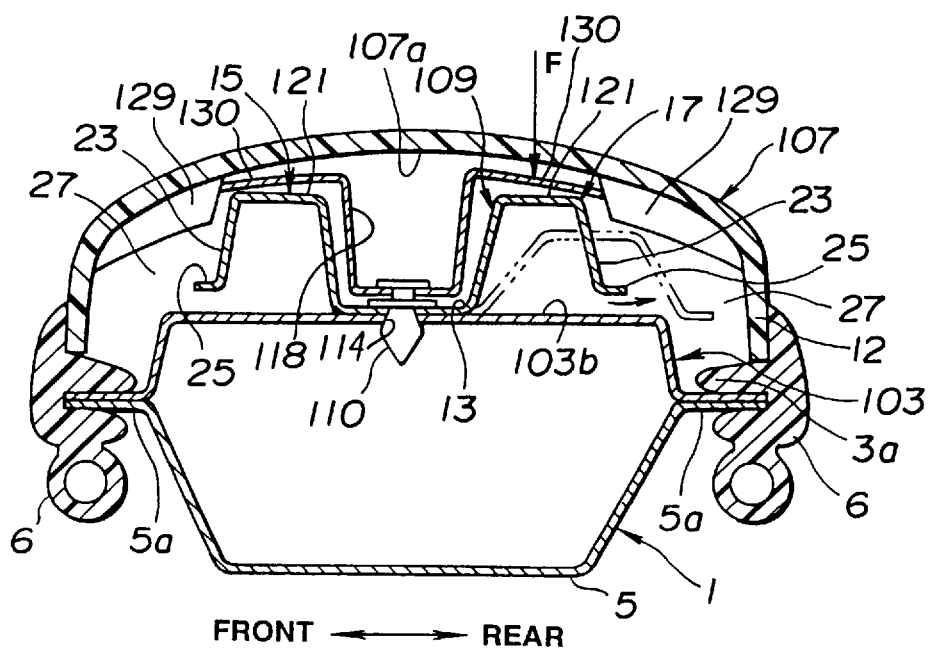
FIG. 4 is a view similar to FIG. 1 but shows another embodiment of the present invention.

FIG. 4 shows another embodiment of the present invention. The features of this embodiment are substantially the same as those described in the previous embodiment except as specifically noted hereinafter. This embodiment is substantially similar to the previous embodiment described with reference to FIGS. 1 to 3, except that a bracket 118 is used in place of the boss 8 integral with the pillar trim 107, the pillar trim 107 has at an outboard or rear surface 107*a* thereof two corner portions opposing to each other and two integral ribs 129 and 129 in the form of thin plate, the bracket 118 is fixedly attached at the opposite end portions 130 thereof to the ribs 129 and 129 by means of a suitable method such as molding in which it is disposed as a core, and a clip 110 serving as a fixture and supported on the bracket 118 is engaged in the through hole 114 at the inboard surface 103*b* of the pillar inner panel 103 for thereby installing the pillar trim 107 on the inboard surface 103*b* of the pillar inner panel 103, whilst holding the steel pad 109 between the bracket 118 and the inboard surface 103*b* of the pillar inner panel 103. The opposite end portions 130 of the bracket 118 are flanged to protrude in opposite directions, as depicted in FIG. 4.

With this construction, the bracket 118 is deformed in a secondary collision at a portion thereof adjacent the clip 110, simultaneously with deformation of the pillar trim 107, thus causing the pillar trim 107 and the bracket 118 to come in conflict with the protruded sections 121 of the steel pad 109. Except for the above, the operation of this embodiment is substantially similar to that of the previous embodiment of FIGS. 1 to 3 and can produce substantially the same effect. In the meantime, in the previous embodiment of FIGS. 1 to 3, there is a possibility that a depressed or distorted surface portion or the like surface defect or surface irregularity is caused in the inboard or front surface of the pillar trim 7 due to the molding of the integral thick-walled boss 8. The use of the independent bracket 118 in place of the boss 8, together with the ribs 129 and 129 in the form of thin plate and formed integral with the pillar trim 107, is effective for eliminating such a possibility.

While the present invention has been described and shown as being applied to a center pillar of a vehicle body, this is not for the purpose of limitation. For example, the present invention can be applied to a front pillar or a rear pillar of a vehicle body to produce the same effect.

Further, while the steel pad has been described and shown as being formed from sheet steel, this is not for the purpose of limitation but it can be another metal pad made of iron other than steel, aluminum, brass, or the like.

What is claimed is:

1. A pillar construction for a vehicle body comprising:

a pillar main body having a pillar inner panel;

a pillar trim supported on said pillar main body in such a manner as to cover said pillar inner panel; and a metal pad supported on said pillar inner panel and restrictedly movable through engagement with said pillar inner panel to produce a reaction force at an initial stage of reaction thereof in response to a force applied thereto from an inside of the vehicle body whereas being freely movable to produce substantially no reaction force after said initial stage.

2. A pillar construction according to claim 1, wherein said metal pad has a central portion having a surface in contact with an inboard surface of said pillar inner panel, and has at least one side portion on a side of said central portion, said side portion having a protruded section located adjacent said pillar trim and a free end section located adjacent said inboard surface of said pillar inner panel.

3. A pillar construction according to claim 2, wherein said free end portion of said side portion of said metal pad is flanged so as to be parallel to said inboard surface of said pillar inner panel.

4. A pillar construction according to claim 2, wherein said pillar trim and said pillar inner panel define therebetween a space enabling said free end section of said metal pad to be movable freely therewithin.

5. A pillar construction according to claim 1, wherein said pillar trim has an integral support projection projecting from an outboard surface thereof toward said pillar inner panel, said metal pad being held between said support projection and said pillar inner panel.

6. A pillar construction according to claim 1, further comprising a bracket attaching said pillar trim to said pillar inner panel, said pillar trim having at an outboard surface thereof two corner portions opposing to each other and two integral ribs in a form of thin plate, said bracket having opposite end portions at which it is secured to said ribs, said metal pad being held between said bracket and said pillar inner panel.

7. A pillar construction according to claim 1, wherein said metal pad is made of steel.

8. A pillar construction for a vehicle body comprising:

a pillar main body having a pillar inner panel;

a pillar trim installed on said pillar main body in such a manner as to cover said pillar inner panel; and a steel pad formed from steel sheet and installed on said pillar inner panel, said steel pad being restrictedly movable to produce a reaction force at an initial stage of movement thereof in response to a force applied thereto from an inside of the vehicle body and freely movable after said initial stage to produce substantially no reaction force.

9. A pillar construction for a vehicle body comprising:

a pillar-shaped main body having a pillar inner panel;

a pillar trim installed on said main body in such a manner as to cover said pillar inner panel; and a resilient sheet steel member serving as a pad, supported on said pillar inner panel and cooperative with said pillar inner panel and adapted to produce a reaction force at an initial stage of application of a force from an inside of the vehicle body against said sheet steel member while adapted to produce substantially no reaction force after said initial stage.

10. A pillar construction according to claim 9, wherein said sheet steel member has a central portion having a surface in contact with an inboard surface of said pillar inner panel, and has a side portion connected to said central portion, said side portion having a protruded section located adjacent said pillar trim and a free end section located adjacent said inboard surface of said pillar inner panel.

11. A pillar construction according to claim 10, wherein said side portion of said sheet steel member has a U-like cross section.

12. A pillar construction according to claim 10, wherein said free end portion of said side portion of said sheet steel member is flanged so as to be parallel to said inboard surface of said pillar inner panel.

13. A pillar construction according to claim 10, wherein said pillar trim and said pillar inner panel define therebetween a space enabling said free end section of said sheet steel member to be movable freely therewithin.

14. A pillar construction according to claim 9, wherein said pillar trim has an integral support projection projecting from an outboard side surface thereof toward said pillar inner panel, said sheet steel member being held between said support projection of said pillar trim and said pillar inner panel.

15. A pillar construction according to claim 9, further comprising a bracket attaching said pillar trim to said pillar inner panel, said pillar trim having at an outboard surface thereof two corner portions opposing to each other and two integral ribs in a form of thin plate, said bracket having opposite end portions at which it is secured to said ribs, said sheet steel member being held between said bracket and said pillar inner panel.

* * * * *